(12) United States Patent
Beers et al.

(10) Patent No.: US 8,278,814 B2
(45) Date of Patent: Oct. 2, 2012

(54) ENHANCED COLOR CONTRAST LIGHT SOURCE

(75) Inventors: William W. Beers, Chesterland, OH (US); Laszlo Balazs, Godollo (HU); Istvan Bakk, Torokbalint (HU)

(73) Assignee: General Electric Company, Schenectady, NY (US)

( * ) Notice: Subject to any disclaimer, the term of this patent is extended or adjusted under 35 U.S.C. 154(b) by 289 days.

(21) Appl. No.: 11/873,463

(22) Filed: Oct. 17, 2007

(65) Prior Publication Data
US 2009/0102348 A1 Apr. 23, 2009

(51) Int. Cl.
*H01J 61/42* (2006.01)
*H01J 1/62* (2006.01)

(52) U.S. Cl. ............... 313/487; 313/486; 252/301.4 R

(58) Field of Classification Search .......... 313/502–503, 313/486–487
See application file for complete search history.

(56) References Cited

U.S. PATENT DOCUMENTS

| | | | |
|---|---|---|---|
| 4,847,533 A | 7/1989 | Hoffman | |
| 5,602,444 A | 2/1997 | Jansma | |
| 5,770,917 A | 6/1998 | Yano et al. | |
| 5,961,208 A | 10/1999 | Karpen | |
| 6,157,126 A | 12/2000 | Yano et al. | |
| 6,222,312 B1 | 4/2001 | Ghosh et al. | |
| 6,525,460 B1 | 2/2003 | Soules | |
| 6,867,536 B2 | 3/2005 | Srivastava et al. | |
| 6,992,432 B1 * | 1/2006 | Jansma | 313/486 |
| 7,119,488 B2 | 10/2006 | Soules et al. | |
| 7,138,757 B2 | 11/2006 | Toth et al. | |
| 7,391,148 B1 | 6/2008 | Setlur et al. | |
| 7,550,910 B2 * | 6/2009 | Jansma | 313/489 |
| 7,670,507 B2 | 3/2010 | Konrad et al. | |
| 2003/0102817 A1 | 6/2003 | Yoo et al. | |
| 2004/0075395 A1 | 4/2004 | Antoniadis et al. | |
| 2004/0130256 A1 * | 7/2004 | Juestel et al. | 313/487 |
| 2004/0144955 A1 * | 7/2004 | Chau | 252/301.4 R |
| 2005/0179358 A1 * | 8/2005 | Soules et al. | 313/487 |
| 2005/0248276 A1 * | 11/2005 | Nomura et al. | 313/635 |
| 2005/0258733 A1 | 11/2005 | Igarashi | |

(Continued)

FOREIGN PATENT DOCUMENTS
CA 2560656 A1 10/2005
(Continued)

OTHER PUBLICATIONS

Wendy Davis et al., "Toward an improved color rendering metric," Reprint: Proc. SOIE Fifth International Conference on Solid State Lighting, SPIE 5941, 59411G, 2005. (Sep. 2005).

(Continued)

*Primary Examiner* — Karabi Guharay
(74) *Attorney, Agent, or Firm* — GE Global Patent Operation; Peter T. DiMauro

(57) ABSTRACT

A lamp having improved color quality scale is provided. The lamp has a light-transmissive envelope and a phosphor layer comprising a first phosphor and a second phosphor wherein the first phosphor has an emission band with a maximum between 590 nm and 640 nm and the second phosphor has an emission band with a maximum between 520 nm and 570 nm. The light generated by the phosphor layer, when the lamp is energized, has delta chroma values for all fifteen color samples of the color quality scale within select parameters. The delta chroma values are measured in the CIE LAB color space.

20 Claims, 6 Drawing Sheets

U.S. PATENT DOCUMENTS

| | | | |
|---|---|---|---|
| 2006/0022582 A1* | 2/2006 | Radkov | 313/503 |
| 2006/0071589 A1 | 4/2006 | Radkov | |
| 2006/0261723 A1 | 11/2006 | Terada et al. | |
| 2007/0223219 A1 | 9/2007 | Medendorp, Jr. et al. | |
| 2009/0102348 A1 | 4/2009 | Beers et al. | |
| 2009/0102391 A1 | 4/2009 | Beers et al. | |
| 2009/0122530 A1 | 5/2009 | Beers et al. | |
| 2009/0134769 A1 | 5/2009 | Cavallaro et al. | |
| 2009/0309482 A1 | 12/2009 | Srivastava | |
| 2010/0096998 A1 | 4/2010 | Beers | |

FOREIGN PATENT DOCUMENTS

| | | |
|---|---|---|
| EP | 945894 | 9/1999 |
| JP | 2007141737 A | 6/2007 |
| WO | 2008006205 A | 1/2008 |

OTHER PUBLICATIONS

Yoshi Ohno, "Spectral design considerations for white LED color rendering," Optical Engineering 44(11), 111302, Nov. 2005.

W. Davis: "Measuring color quality of light sources", SPIE, PO Box 10 Bellingham WA 98227-0010 USA, vol. 6337, No. 63370, 2006, pp. 1-10, XP040229620.

Y. Ohno: Measurement of LEDS and Solid State Lighting [Online] Oct. 18, 2007, pp. 1-49, XP002569094 . Available from internet url: http://cie-cnc.ca/en/Ohno% 2OCNC- USNC%202007.pdf ; pp. 45-46.

International Search Report issued in connection with corresponding PCT Application No. PCT/US2009/065615 on Jan. 28, 2010.

U.S. Appl. No. 12/246,110, filed Oct. 6, 2008, William Beers.

U.S. Appl. No. 12/256,227, filed Oct. 22, 2008, William Beers.

U.S. Appl. No. 12/911,273, filed Oct. 25, 2010, Katalin Toth.

U.S. Appl. No. 12/952,940, filed Nov. 23, 2010, Katalin Toth.

Davis and Ohno, "Color Quality Scale", Optical Engineering, vol. 49, #3 p. 033602 (Mar. 2010).

Zukauskas, Vaicekauskas and Shur, Colour-rendition properties of solid-state lamps, Journal of Physics D: Appl, Phys., Published Aug. 19, 2010, vol. 43, p. 354006, (http://iopscience.iop.org/0022-3727/43/35/354006).

W.Davis: Measuring color quality of light sources:,SPIE, PO Box 10 Bellingham WA 98227-0010 USA, vol. 6337, No. 63370, 2006 pp. 1-10, XP040229620.

Phosphor Mixture for Clour-variable flourescent Lamp, IP.COM Journal, IP.COM Inc., West Henrietta, NY, UA, Oct. 3, 2006, XP013116106, ISSN: 1533-0001, p. 3 figures.

"Toward an Improved Color Rendering Metric", Fifth International Conference on Solid State Lighting, Edited by Ian T. Ferguson, et al, SPIE vol. 5941, PO Box 10 Bellingham WA 98227-0010 USA, 2005.

WO Search Report issued in connection with corresponding WO Patent Application No. US2009/055806 filed on Sep. 3, 2009.

WO Search Report issued in connection with corresponding WO Patent Application No. PCT/US2008/079034 filed on Oct. 7, 2008.

\* cited by examiner

ENHANCED COLOR CONTRAST LIGHT SOURCE

FIELD OF THE INVENTION

The present invention relates to a lamp, and more particularly to a fluorescent lamp having enhanced color contrast.

DESCRIPTION OF RELATED ART

Fluorescent lighting provides an energy-efficient alternative to common incandescent lighting. However, the adoption of fluorescent lighting has been hindered in certain applications such as illuminating items in a retail setting. The quality of object color under fluorescent lighting is an important aspect of the value of the light source. Fluorescent lighting can produce visible light having muted light in the red region of the spectrum and an overemphasized amount of light in the yellow region. This lighting has been observed to produce cold or sterile light and light that generally washes out colors of the items being illuminated.

Incandescent lamps are known to generate significant light in the yellow region of the visible spectrum such as that produced by fluorescent lamps. One solution has been to filter out a portion of the yellow light with a glass envelope containing the rare earth element neodymium. An incandescent light bulb using neodymium doped glass is the REVEAL® bulbs produced by GE. These bulbs depress light in the yellow region and thus have a greater red-green color contrast when compared with regular incandescent bulbs. As a result, consumers have found the enhanced color contrast light produced by the REVEAL® bulbs to be appealing. Thus, it would be desirable to develop light sources with enhanced color contrast similar to those achievable by neodymium glass-filtered incandescent sources.

Filtration with neodymium glass also tends to reduce the quantity of light produced by incandescent lamps. This disadvantage is acceptable due to the sufficient brightness of incandescent lamps. However, reduced lumen output in other lighting sources such as fluorescent lighting is less acceptable. There is a need for light sources other than incandescent lamps that generate enhanced color contrast without suffering from losing light output through filtering methods such as using neodymium glass.

SUMMARY OF THE INVENTION

A lamp having an improved color quality scale comprising a light-transmissive glass envelope having an inner surface; a discharge-sustaining fill gas sealed inside the envelope; a phosphor layer having a phosphor composition comprising a first phosphor and a second phosphor. The first phosphor can be selected from Yttrium Oxide:Eu ($Y_2O_3$:Eu) (YEO); $3.5MgO*0.5MgF_2*GeO_2$;$Mn^{4+}$ (MfG); Gadolinium Zinc Magnesium Pentaborate: Ce, Mn (Gd(Zn,Mg)$B_5O_{10}$:Ce,Mn) (CBM); Strontium red (Sr, Mg)$_3$(PO$_4$)$_2$:Sn and yttrium vanadate (Y(V,P)O$_4$:Eu ) or combinations thereof. The second phosphor can be selected from (Ba,Sr,Ca)MgAl$_{10}$O$_{17}$:$Eu^{2+}$, $Mn^{2+}$ (BAMn); Cerium Lanthanium Phosphate (LaPO$_4$:Ce, Tb) (LAP); ZnSiO$_4$:Mn; (Ce,Tb)MgAl$_{11}$O$_{19}$ (CAT) and (Ce, Tb)(Mg,Mn)Al$_{11}$O$_{19}$ or combinations thereof.

A lamp having an improved color quality scale comprising a light-transmissive envelope having an inner surface; a discharge-sustaining fill gas sealed inside the envelope and a phosphor layer having a phosphor composition between the fill and the envelope, wherein the phosphor composition comprises a first phosphor and a second phosphor. The first phosphor having an emission band with a maximum between 590 nm and 640 nm and being present in an amount of 10 to 90 weight percent based on total weight of the phosphors. The second phosphor having an emission band with a maximum between 520 nm and 570 nm and being present in an amount of 5 to 50 weight percent. The lamp further having a $Q_a$ value greater than 65 and a correlated color temperature between about 2500 and 3500 Kelvin.

A lamp having an improved color quality scale comprising a light-transmissive envelope having an inner surface; a discharge-sustaining fill gas sealed inside the envelope, a phosphor layer having a phosphor composition comprising at least two phosphors and when energized the lamp generates light having delta chroma values for all fifteen ($VS_{1-15}$) color samples of the color quality scale within the following parameters: −2 to 7 for VS 1; −3 to 7 for VS 2; −7 to 7 for VS 3; −2 to 7 for VS 4; −2 to 14 for VS 5; 1 to 19 for VS 6; 4 to 24 for VS 7; −1 to 15 for VS 8; −2 to 7 for VS 9; −2 to 6 for VS 10; −2 to 6 for VS 11; −1 to 8 for VS 12; −1 to 13 for VS 13; −3 to 13 for VS 14; and −6 to 12 for VS 15, wherein the delta chroma values are measured in the CIE LAB space.

DETAILED DESCRIPTION OF THE PREFERRED EMBODIMENTS OF THE INVENTION

In the description that follows, when a preferred range, such as 5 to 25 (or 5-25), is given, this means preferably at least 5 and, separately and independently, preferably not more than 25.

Figure 1:
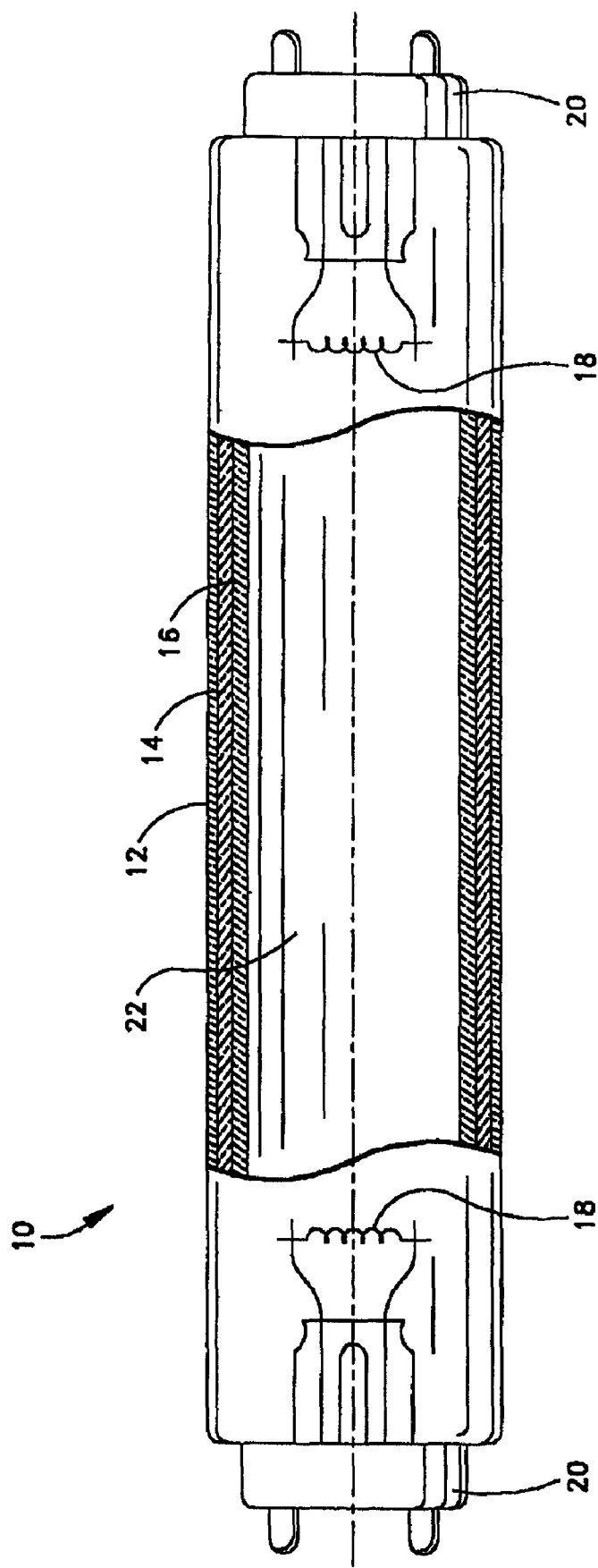
FIG. 1 shows diagrammatically, and partially in section, a lamp according to the present invention.
Figure 2:
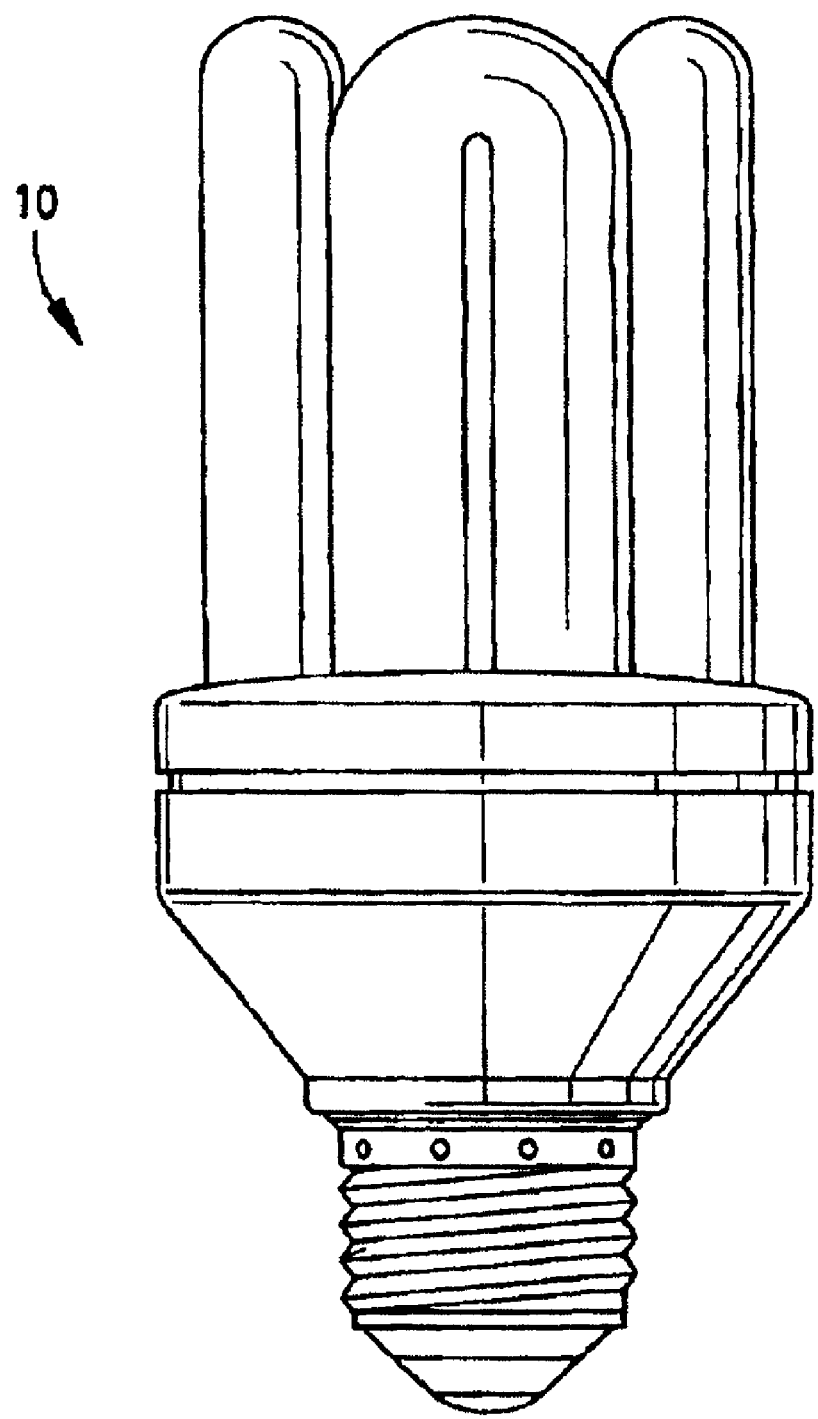
FIG. 2 shows a compact fluorescent lamp according to the present invention.

With reference to FIG. 1, there is shown a low pressure mercury vapor discharge lamp 10 according to the invention, which is generally well known in the art. The lamp 10 has a light-transmissive, preferably linear and cylindrical, glass tube or envelope 12 that preferably has a circular cross section. The inner surface of the envelope 12 is preferably provided with a reflective barrier coating or layer 14 for improved light softness and brightness maintenance with age. The inner surface of the barrier layer 14 is preferably provided with a phosphor layer 16, the barrier layer 14 being between the envelope 12 and the phosphor layer 16. Phosphor layer 16 is preferably a rare earth phosphor layer, such as a rare earth triphosphor or multi-phosphor layer, or other phosphor layer. Lamp 10 can be a fluorescent lamp, such as a T12, T10 or T8 lamp, which is generally known in the art, nominally 48 inches or 4 feet in length, a cylindrical tube, and having a nominal outer diameter of at least 1 inch or an outer diameter of 1 inch or about 1 inch. The lamp 10 can also be nominally 1.5, 2, 3, 5, 6 or 8 feet long. Alternatively, the lamp 10 can be nonlinear, for example circular or otherwise curvilinear in shape, or have a nominal outer diameter less than one inch such as a T5, T4 or T3 lamp having nominal outer diameters of about 0.625 (⅝) inch, 0.5 (½) inch and 0.375 (⅜) inch, respectively. In this alternative case, as shown in FIG. 2, the lamp 10 can also be nominally 1.5, 2, 3, 4, 5, 6 or 8 feet long, or it may be a compact fluorescent lamp (CFL) having a folded or wrapped topology so that the overall length of the lamp is much shorter than the unfolded length of the glass tube.

Although not shown, the lamp 10 can be a light emitting diode (LED) device or an organic light emitting device (OLED). LEDs are semiconductor light emitters that generally emit light in the UV and/or blue range of the electromagnetic spectrum. To convert the light emitted from LEDs to useful light for illumination purposes, the LED can be coated with the phosphor compositions described below. OLEDs are light emitting diodes whose emissive electroluminescent layer generally comprises a film of organic compounds.

Figure 3:
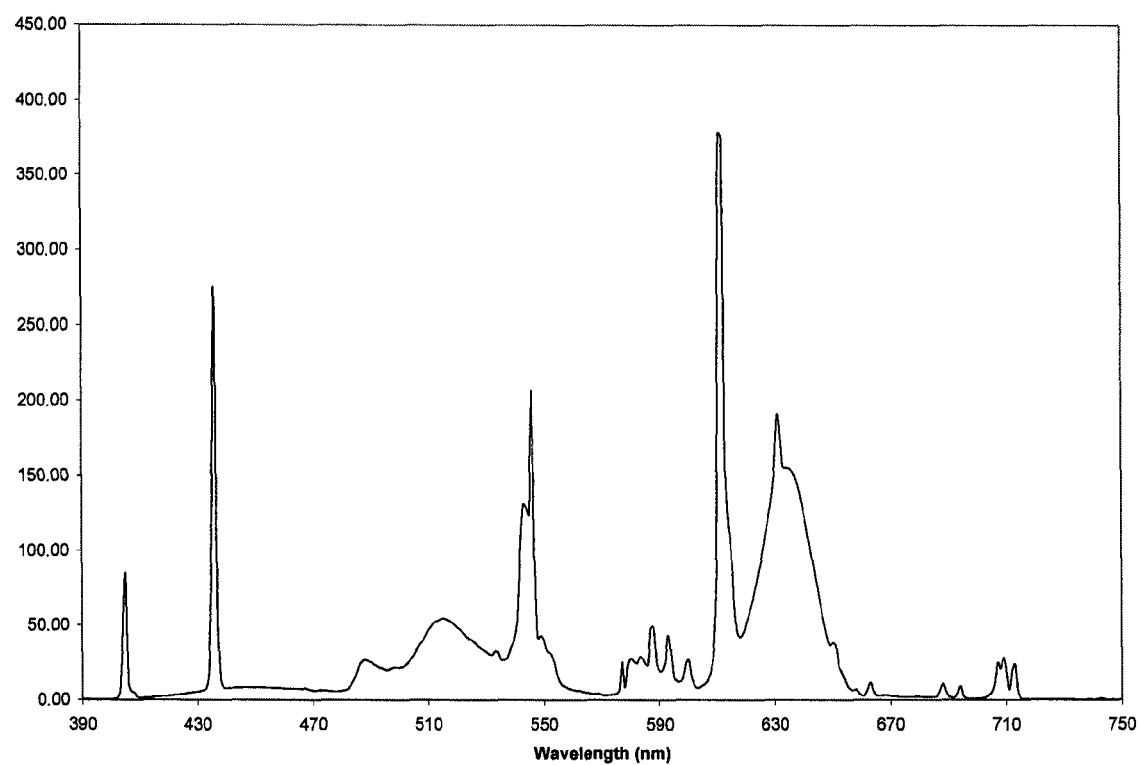
FIG. 3 is a theoretical estimated emission spectrum for a compact fluorescent lamp having a LED device providing a portion of the visible spectrum.

In another embodiment, the lamp 10 can be a fluorescent or CFL lamp in combination with an LED. For instance, a combination of LED-generated light and phosphor-generated light may be used to produce visible light having enhanced color contrast. In this instance, an LED can be mounted in the base of a fluorescent of CFL lamp to add to or supplement light in select wavelength regions of the visible spectrum, such as a portion of the red region, to the light being generated by the phosphor composition coated on the glass envelope 12 of a lamp 10. For example, an LED mounted in the base of a fluorescent or CFL lamp can generate light in the red region and thus a phosphor composition can be selected that excludes or minimizes the use of red phosphors. Such a lamp might include, for instance, a blend of phosphors, such as YEO, LAP, BAM, and BAMn, and an LED that generates visible light having a peak emission in the range of 615 to 645 nm, preferably 625 to 635 nm, or about 625 nm, 630 nm or 635 nm. The weight percent of each phosphor in the blend is preferably about 64 wt % YEO, 14 wt % LAP, 1 wt % BAM and 21 wt % BAMn. It is to be understood that the respective weight percents of the phosphors of the phosphor blend can vary depending on the selected manufacturer or supplier and the specific lot used. For instance, the above phosphor weight percents can vary about ±5 wt %. The LED preferably emits in the red region of the visible spectrum. For example, a Golden Dragon® Thinfilm/ThinGaN® LED (type LR W5SM) supplied by OSRAM Opto Semiconductors, which has an emission at about 625 nm, can be used as an LED in the base of a CFL lamp. Although a lamp containing the above-noted blend of phosphors and an LED was not constructed, the emission spectrum of such a lamp was calculated and estimated in order to evaluate its improved color contrast. FIG. 3 shows a calculated emission spectrum for a 9-watt compact fluorescent lamp having a phosphor blend of approximately 64 wt % YEO, 14 wt % LAP, 1 wt % BAM and 21 wt % BAMn and one OSRAM Golden Dragon® LED, type LR W5SM, having an emission peak at about 635 nm.

In another embodiment, the lamp 10 can be a high-intensity discharge (HID) lamp (not shown). The HID lamp 10 may include, for example, mercury vapor, metal halide, low-pressure sodium or high-pressure sodium lamps. HID lamps produce light by generating an electric arc across two electrodes that are generally located inside a tube, such as a fused quartz or fused alumina tube. The tube is filled with gas and metals as known in the art. The metals generate light when the lamp 10 is activated.

FIG. 1 illustrates a fluorescent lamp 10. The lamp 10 is hermetically sealed by bases 20 attached at both ends and electrodes or electrode structures 18 (to provide an arc discharge) are respectively mounted on the bases 20. A discharge-sustaining fill 22 is provided inside the sealed glass envelope, the fill comprising or being an inert gas or inert gas mixture at a low pressure in combination with a small quantity of mercury to provide the low vapor pressure manner of lamp operation.

The inert gas in the fill comprises at least one rare gas such as, but not limited to, argon, krypton, xenon and neon or combinations thereof. The total pressure of the fill 22 (including mercury vapor and inert gas) is preferably 0.4-4, preferably 1-3, preferably 1.6-2.8, torr at the conventional fill temperature as known in the art, for example 25° C.

The general coating structure is preferably as taught in U.S. Pat. No. 5,602,444. This coating structure is known in the art. As disclosed in the '444 patent, the barrier layer 14 comprises a blend of gamma- and alpha-alumina particles that are preferably 5-80 or 10-65 or 20-40 weight percent gamma alumina and 20-95 or 35-90 or 60-80 weight percent alpha alumina. The phosphor layer 16 is coated on the inner surface of the barrier layer 14 and preferably has a coating weight of 1-5 or 2-4 mg/cm$^2$ or other conventional coating weight.

The phosphor layer 16 preferably comprises a phosphor composition having a mixture of at least two phosphors. The phosphors may be, for example, rare earth phosphors, halophosphors, or a combination thereof. Phosphor blends comprising other numbers of phosphors such as blends with three or more phosphors, may be used in the phosphor layer 16.

The light generated by the phosphor composition of the phosphor layer 16 provides a select color point having its own set of chroma values. The novel combinations of phosphors herein provide light having enhanced color contrast or chroma. As such, the desirable spectra characteristics of a REVEAL® light bulb is similarly produced without the need for filtration or decreased lumen output associated with filtration methods. The blend of phosphors in the phosphor layer 16 provides light having a depressed yellow region and an enhanced red-green color contrast that is useful in illuminating objects such that the objects appear appealing to consumers.

In one embodiment, there is provided a novel phosphor composition, which may be used in the phosphor layer 16 in the above described lamp 10, wherein the phosphor composition includes a blend of at least two phosphors that generate light having an enhanced color contrast such that the light has delta chroma values falling within the parameters shown below in Table 1 for each of the color samples utilized in the color quality scale (CQS). The chroma values for the light generated by the phosphor composition as it relates to the fifteen color samples are measured in the CIE LAB space. The chroma values can be calculated by conventional techniques, for example, in the CIE LAB color space. For example, the CIE 1976 a, b chroma value is calculated as $C^*_{ab}=(a^{*2}+b^{*2})^{1/2}$, *Illuminating Engineering Society of North America Lighting Handbook*.

The CQS, as developed by the National Institute of Standards and Technology (NIST), uses fifteen Munsell color samples to evaluate aspects of the color of objects illuminated by a light source, such as that similarly done by the color rendering index (CRI). The CRI utilizes fourteen standard color samples (i.e. $R_1$-$R_{14}$), wherein the general color rendering index (Ra) is the average $R_i$ for the first eight samples, all of which are low to medium chromatic saturation. The CRI system of measuring object color suffers from disadvantages such as the red region of the color space is non-uniform and the eight color samples used to calculate the Ra are not highly saturated. Thus, because color rendering of saturated colors can be very poor even when the Ra value is high, an optimization of a lamp's spectra to the CRI can be made with very high Ra values while actual color rendering is much poorer. In other words, because the eight color samples are simply averaged to obtain a Ra value, a lamp can score high even though it renders one or two colors very poorly. This problem arises because too few samples of high chromatic saturation are used to calculate Ra. CQS overcomes these disadvantages of the CRI system and is therefore preferably used as the system to evaluate the aspects of object color. The CQS system uses an overall $Q_a$ value that incorporates the color appearance of all fifteen color samples, of which all have relatively high chromatic saturation and are substantially evenly distributed in the color space. The $Q_a$ value generally corresponds to the average of the individual CQS values for each of the fifteen color samples. Calculation of the $Q_a$ value is more fully described in W. Davis and Y. Ohno, "Toward an improved color rendering metric," *Proc. SPIE Fifth International Conference on Solid State Lighting*, 5941, 2005, the entire contents of which are hereby incorporated by reference.

As set by NIST, the CQS utilizes a standard set of fifteen saturated Munsell color samples having the following hue value/chroma: 7.5 P 4/10; 10 PB 4/10; 5 PB 4 12; 7.5 B 5/10; 10 BG 6/8; 2.5 BG 6/10; 2.5 G 6/12; 7.5 GY 7/10; 2.5 GY 8/10; 5 Y 8.5/12; 10 YR 7/12; 5 YR 7/12; 10 R 6/12; 5 R 4/14; and 7.5 RP 4/12. These values (hue value/chroma) respectively correspond to the fifteen Munsell color samples of the CQS, which are labeled as VS 1, VS 2, VS 3, VS 4, VS 5, VS 6, VS 7, VS 8, VS 9, VS 10, VS 11, VS 12, VS 13, VS 14 and VS 15 (i.e. $VS_{1-15}$). In other words, VS 1 corresponds to the first Munsell color sample, VS 2 corresponds to the second Munsell color sample, and so on. The hue labels have the following descriptions: "P" is purple, "PB" is purple-blue, "B" is blue, "BG" is blue-green, "G" is green, "GY" is green-yellow, "Y" is yellow, "YR" is yellow-red, "R" is red and "RP" is red-purple.

Table 1 references the desirable delta chroma values for the light emitted by phosphor compositions of the present invention. The phosphor composition generates light having chroma values at a select color point. For each set of chroma values generated by the phosphor composition, a reference source of chroma values at the same color point can be calculated. The reference source chroma values represent a Planckian radiator matched to the correlated color temperature (CCT) of the light generated by the phosphor composition. The delta chroma value for each Munsell color sample is the difference between the chroma value of the light generated by the phosphor composition and the reference source chroma value. Thus, the delta chroma values of Table 1 represent the shift in chroma when the reference source is compared to the light generated by the phosphor composition.

The delta chroma values are useful for identifying color perceptions and evaluating the enhanced color contrast of the phosphor compositions described herein. The delta chroma values of Table 1 can be used to select and/or evaluate a lamp 10 of the present invention. For example, a lamp 10 generating light within the delta chroma values of Table 1 will have enhanced color contrast that is similarly produced by a REVEAL® light bulb. Thus, Table 1 desirably provides a set of delta chroma value parameters for each of the fifteen color samples of the CQS system that can be used to adapt or select a lamp 10 having an enhanced color contrast. Preferably, a lamp 10 generates light having chroma values that fall within the chroma delta values of Table 1 for at least two, three, four, five, six, seven, eight, nine, ten, eleven, twelve, thirteen or fourteen of the fifteen Munsell color samples. More preferably, the lamp 10 generates light having chroma delta values that fall within the chroma delta parameter of Table 1 for all fifteen color samples (i.e. $VS_{1-15}$) of the CQS.

The chroma value for each of the fifteen Munsell color samples of the CQS are calculated in the CIE LAB space. The minimum, preferred minimum, preferred maximum and maximum delta chroma values for the fifteen CQS color samples are shown in Table 1 below.

TABLE 1

Parameters for the Color Samples of the Color Quality System (CQS) at a CCT of 2750K

| Color Sample | Minimum delta Chroma Value | Preferred Minimum delta Chroma Value | Preferred Maximum delta Chroma Value | Maximum delta Chroma Value |
|---|---|---|---|---|
| VS 1 | −2 | 0 | 5 | 7 |
| VS 2 | −3 | −1 | 5 | 7 |
| VS 3 | −7 | −5 | 5 | 7 |
| VS 4 | −2 | 0 | 5 | 7 |
| VS 5 | −2 | 0 | 10 | 14 |
| VS 6 | 1 | 3 | 15 | 19 |
| VS 7 | 4 | 6 | 15 | 24 |
| VS 8 | −1 | 2 | 10 | 15 |
| VS 9 | −2 | 0 | 5 | 7 |
| VS 10 | −2 | 0 | 5 | 6 |
| VS 11 | −2 | 0 | 5 | 6 |
| VS 12 | −1 | 0 | 6 | 8 |
| VS 13 | −1 | 2 | 10 | 13 |
| VS 14 | −3 | 2 | 10 | 13 |
| VS 15 | −6 | 2 | 10 | 12 |

The light generated by the phosphor composition of the phosphor layer 16 preferably has delta chroma values for each of the fifteen Munsell color samples of the CQS that fall within the following minimum chroma and maximum chroma delta values as shown in Table 1 above for each of the Munsell color samples measured at a correlated color temperature of 2200 to 3500K, preferably 2350 to 3250K and preferably about 2500 to 3000K. The phosphor layer 16 of the present invention can also generate light having delta chroma values falling within the values of Table 1 at correlated color temperatures above 5500K, or about 6100K. Preferably, the light generated by the phosphor composition has delta chroma values for each of the fifteen Munsell color samples of the CQS that fall within the following preferred minimum chroma and preferred maximum chroma delta values as shown in Table 1. Alternatively, the light generated by the phosphor layer 16 has chroma values that fall within the minimum chroma and maximum chroma delta values for preferably at least two, three, four, five, six, seven, eight, nine, ten, eleven, twelve, thirteen or fourteen of the fifteen Munsell color samples when measured at the above CCT ranges. In a more preferable alternative, the light generated by the phosphor layer 16 has chroma values that fall within the preferred minimum chroma and preferred maximum chroma delta values for preferably at least two, three, four, five, six, seven, eight, nine, ten, eleven, twelve, thirteen or fourteen of the fifteen Munsell color samples.

In one embodiment, a phosphor composition comprising at least two phosphors, a first phosphor and a second phosphor, generates light having chroma values measured by the NIST CQS method described herein that fall within the minimum and maximum values and more preferably within the preferred minimum and preferred maximum values for each of the fifteen color sample listed in Table 1 (i.e. $VS_{1-15}$). The first phosphor can be any individual phosphor compound or blend of phosphor compounds. The first phosphor can include, but is not limited to, Yttrium Oxide:Eu ($Y_2O_3$:Eu) (YEO); $3.5MgO*0.5MgF_2*GeO_2$:$Mn^{4+}$ (MfG); Gadolinium Zinc Magnesium Pentaborate: Ce, Mn ($Gd(Zn,Mg)B_5O_{10}$:Ce,Mn)

(CBM); Strontium red $(Sr, Mg)_3(PO_4)_2$:Sn and yttrium vanadate $(Y(V,P)O_4$:Eu ) or combinations thereof. The various phosphors described herein can have different elements enclosed in parentheses and separated by commas, such as in the below $(Ba,Sr,Ca)MgAl_{10}O_{17}$:Eu$^{2+}$, Mn$^{2+}$ phosphor. As understood by one skilled in the art, this style of notation denotes that the phosphor can include any or all of the specified elements in the formulation in any ratio. In other words, this style of notation has the same meaning as $(Ba_{1-a-b},Sr_a,Ca_b)MgAl_{10}O_{17}$:Eu$^{2-}$,Mn$^{2+}$, wherein $0 \leq a,b \leq 1$.

The second phosphor material can be any individual phosphor compound or blend of phosphor compounds. The second phosphor can include, but is not limited to, $(Ba,Sr,Ca)MgAl_{10}O_{17}$:Eu$^{2+}$,Mn$^{2-}$ (BAMn); Cerium Lanthanium Phosphate $(LaPO_4$:Ce,Tb) (LAP); $ZnSiO_4$:Mn; $(Ce,Tb)MgAl_{11}O_{19}$ (CAT) and $(Ce,Tb)(Mg,Mn)Al_{11}O_{19}$ or combinations thereof.

Other phosphors in addition to or in place of the above first and second phosphors may be used. Other suitable phosphors include, but are not limited to, all of the above phosphors, $(Ba,Sr,Ca)MgAl_{10}O_{17}$:Eu$^{2-}$ (BAM); $(Sr,Ba,Ca)_5(PO_4)_3$Cl:Eu (SECA); $Sr_4Al_{14}O_{25}$:Eu (SAE); YAG:Ce $(Y_3Al_5O_{12}$:Ce) and $Ca_{10}(PO_4)_6$FCl:Sb,Mn or combinations thereof Individual phosphor material amounts used in the phosphor composition of the phosphor layer 16 will vary depending upon the desired color spectra and/or color temperature. The relative amount of a phosphor material can be described by its spectral weight. That is, the spectral weight is the amount each phosphor material supplies to the overall emission spectra. It is to be understood that one of ordinary skill in the art would appreciate that other phosphor compounds having similar emission spectra may be used in the phosphor compositions described herein. The weight percent of each phosphor composing the phosphor layer 16 may vary depending on the characteristics of the desired light output.

Figure 4:
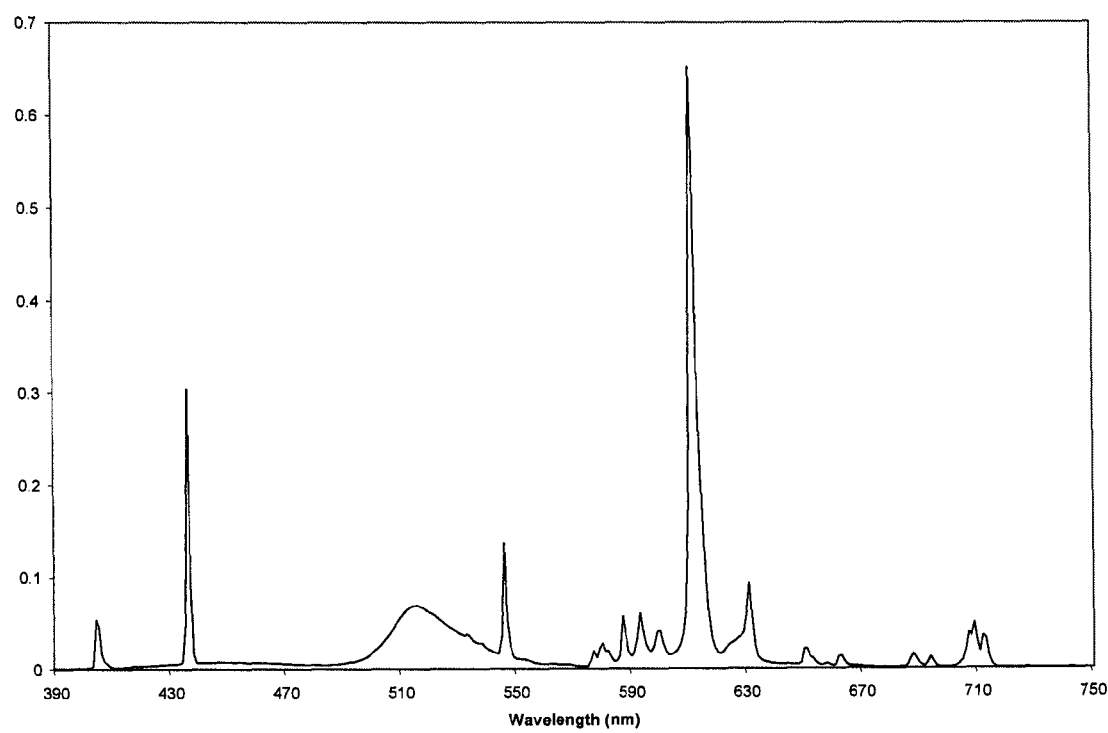
FIG. 4 is an emission spectrum for the multi-phosphor lamp of Example 1 having a CCT of about 2750K.
Figure 5:
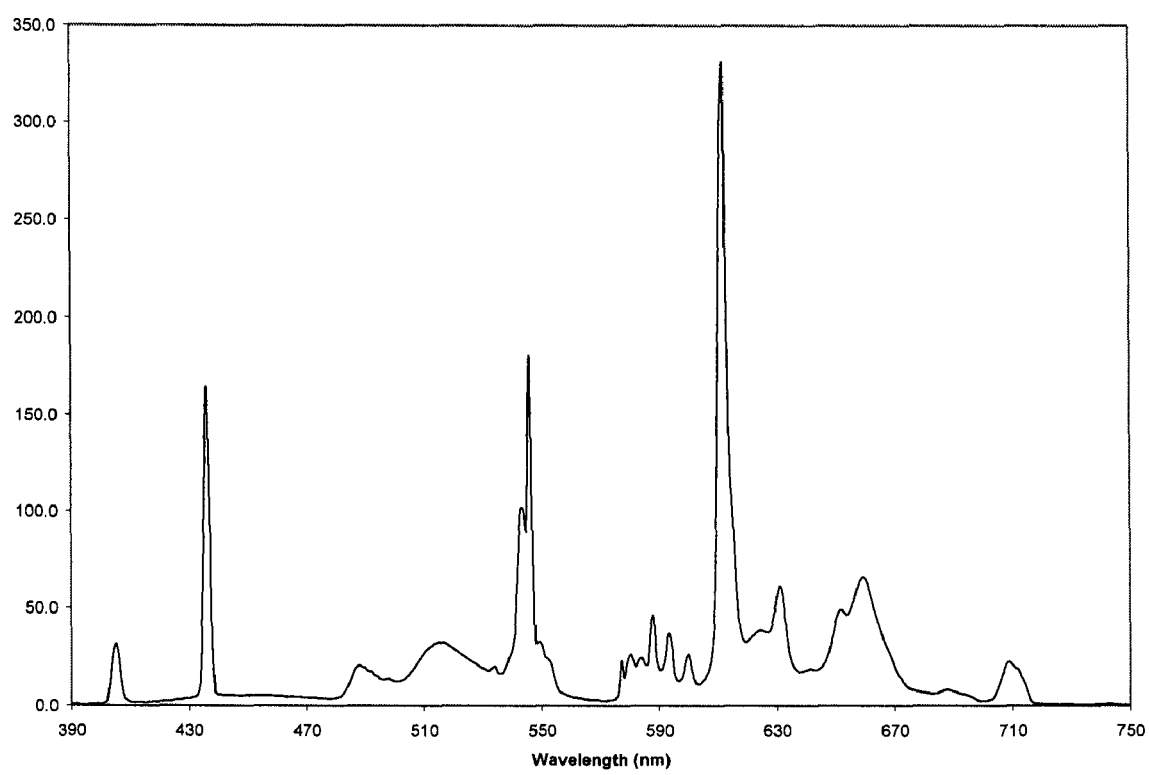
FIG. 5 is an emission spectrum for the multi-phosphor lamp of Example 2 having a CCT of about 2750K.
Figure 6:
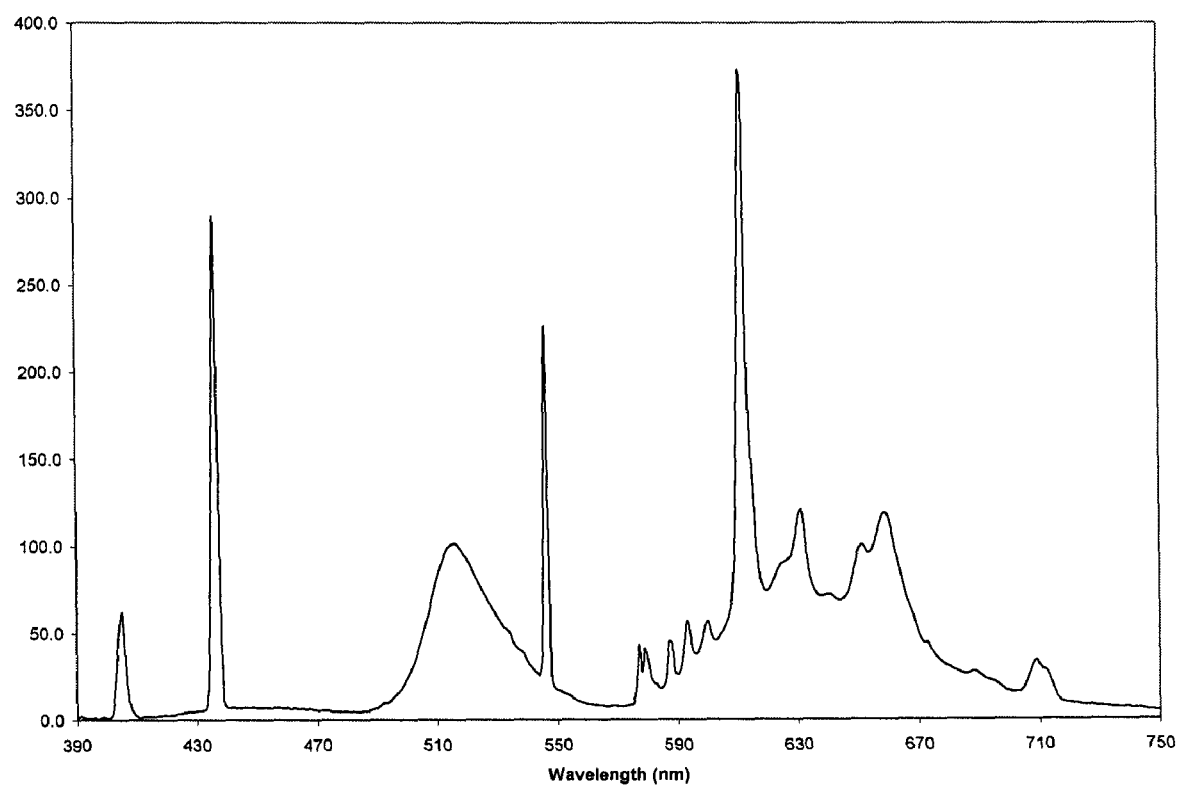
FIG. 6 is an emission spectrum for the multi-phosphor lamp of Example 5 having a CCT of about 2750K.

In another embodiment, there is provided a phosphor composition, which may be used in the phosphor layer 16, comprising a phosphor composition of at least two phosphors including a first phosphor having a peak emission between 590 and 640 nm, preferably 600 and 630 nm and preferably 605 and 620 nm and a second phosphor having a peak emission between 500 and 570 nm, preferably 520 and 560 nm and preferably 535 and 555 nm in the emission spectra of the lamp 10 in the region from 400 to 750 nm. The first phosphor is preferably Yttrium Oxide:Eu $(Y_2O_3$:Eu) (YEO); Gadolinium Zinc Magnesium Pentaborate: Ce, Mn$(Gd(Zn,Mg)B_5O_{10}$:Ce,Mn) (CBM); Strontium red $(Sr, Mg)_3(PO_4)_2$:Sn and yttrium vanadate $(Y(V,P)O_4$:Eu) or combinations thereof. The second phosphor is preferably $(Ba,Sr,Ca)MgAl_{10}O_{17}$:Eu$^{2+}$,Mn$^{2+}$ (BAMn); Cerium Lanthanium Phosphate $(LaPO_4$:Ce,Tb) (LAP); $ZnSiO_4$:Mn; $(Ce,Tb)MgAl_{11}O_{19}$ (CAT) and $(Ce,Tb)(Mg,Mn)Al_{11}O_{19}$ or combinations thereof. Preferably, the first phosphor has a weight percentage of about 10 to 90 wt %, preferably 20 to 80 wt % and preferably 25 to 75 wt %. Preferably, the second phosphor has a weight percentage of about 5 to 50 wt %, preferably 10 to 40 wt % and preferably 15 to 30 wt %. Weight percentages as used herein are based on total weight of the phosphor composition. It is understood the phosphor blend converts radiation at a specified wavelength, for example radiation with a peak from about 250 to 500 nm as emitted by a UV source, into visible light of a different wavelength. Exemplary emission spectra for lamps 10 of the present invention are shown in FIGS. 4, 5 and 6.

In order to promote a further understanding of the invention, the following examples are provided. These examples are shown by way of illustration and not limitation.

EXAMPLE 1

A conventional T8 fluorescent lamp was constructed with a phosphor layer comprising Yttrium Oxide:Eu $(Y_2O_3$:Eu) (YEO); $(Ba,Sr,Ca)MgAl_{10}O_{17}$:Eu$^{2-}$ (BAM) and $(Ba,Sr,Ca)MgAl_{10}O_{17}$:Eu$^{2+}$,Mn$^{2+}$ (BAMn). The weight percents (based on total weight of the phosphors) of the phosphors were 74.6 wt %, 0.9 wt % and 24.5 wt %, respectively. The lamp comprised a barrier layer between the glass envelope and the phosphor layer. FIG. 4 shows the emission spectrum for the lamp of this Example.

When energized, the lamp generated light having delta chroma values for each of the fifteen color samples of the CQS system as follows (delta chroma value/CQS color sample): −1.1/VS 1; 3.7/VS 2; −4.5/VS 3; 4.2/VS 4; 10.6/VS 5; 18.6/VS 6; 22/VS 7; 7.6/VS 8; −1/VS 9; 2.5/VS 10; 1.4/VS 11; 4.7/VS 12; 8.1/VS 13; −2.2/VS 14 and −5.6/VS 15. The lamp produced chromaticity coordinates (x,y) of 0.446 and 0.391, an operating lumens per watt (L/w) value of about 76 and a $Q_a$ value of 66 at a CCT of about 2750.

The chroma values for the light generated as measured in the CIE LAB space for each of the fifteen color samples were as follows 32.38/VS 1; 39.27/VS 2; 44.68/VS 3; 54.76/VS 4; 55.17/VS 5; 62.88/VS 6; 68.89/VS 7; 54.18/VS 8; 59.96/VS 9; 79.03/VS 10; 77.85/VS 11; 78.27/VS 12; 75.71/VS 13; 66.36/VS 14 and 43.44/VS 15. The chroma values for the reference source as measured in the CIE LAB space for each of the fifteen color samples were as follows 33.45/VS 1; 35.53/VS 2; 49.21/VS 3; 50.54/VS 4; 44.53/VS 5; 44.23/VS 6; 46.86/VS 7; 46.59/VS 8; 60.98/VS 9; 76.53/VS 10; 76.41/VS 11; 73.59/VS 12; 67.58/VS 13; 68.51/VS 14 and 49.07/VS 15. The delta chroma values given above represent the difference between the reference source chroma values and the chroma values measured for the test lamp. With regard to the examples below, the delta chroma values were calculated the same way as in this example.

EXAMPLE 2

A conventional T8 fluorescent lamp was constructed with a phosphor layer comprising $3.5MgO*0.5MgF_2*GeO_2$:Mn$^{4+}$ (MfG); Yttrium Oxide:Eu $(Y_2O_3$:Eu) (YEO); $(Ba,Sr,Ca)MgAl_{10}O_{17}$:Eu$^{2+}$ (BAM); $(Ba,Sr,Ca)MgAl_{10}O_{17}$:Eu$^{2+}$,Mn$^{2+}$ (BAMn) and Cerium Lanthanium Phosphate $(LaPO_4$:Ce,Tb) (LAP). The weight percents of the phosphors were 19.44 wt %, 52.24 wt %, 1.43 wt %, 12.37 wt % and 14.52 wt %, respectively. The lamp comprised a barrier layer between the glass envelope and the phosphor layer. FIG. 5 shows the emission spectrum for the lamp of this Example.

When energized, the lamp generated light having delta chroma values for each of the fifteen color samples of the CQS system as follows (delta chroma value/CQS color sample): 2.8/VS 1; 4.2/VS 2; −4.2/VS 3; −1.3/VS 4; 3.1/VS 5; 9.1/VS 6; 13.8/VS 7; 8/VS 8; 4.3/VS 9; 4.6/VS 10; 0.6/VS 1; 2.5/VS 12; 5.7/VS 13; 2/VS 14 and −0.1/VS 15. The lamp produced chromaticity coordinates (x,y) of 0.444 and 0.396, an operating lumens per watt (L/w) value of about 66 and a $Q_a$ value of 79 at a CCT of about 2840.

EXAMPLE 3

A conventional T8 fluorescent lamp was constructed with a phosphor layer comprising $3.5MgO*0.5MgF_2*GeO_2$:Mn$^{4+}$ (MfG); Yttrium Oxide:Eu $(Y_2O_3$:Eu) (YEO); $(Ba,Sr,Ca)MgAl_{10}O_{17}$:Eu$^2$ $^+$ (BAM) and $(Ba,Sr,Ca)MgAl_{10}O_{17}$:Eu$^{2+}$,Mn$^{2+}$ (BAMn). The weight percents of the phosphors were 23.88 wt %, 57.44 wt %, 1.13 wt % and 17.56 wt %, respectively. The lamp comprised a barrier layer between the glass envelope and the phosphor layer.

When energized, the lamp generated light having delta chroma values for each of the fifteen color samples of the CQS system as follows (delta chroma value/CQS color sample): 2/VS 1; 5.3/VS 2; −3.2/VS 3; 6.4/VS 4; 13.1/VS 5; 21.9/VS 6; 27/VS 7; 11.9/VS 8; 3/VS 9; 10/VS 10; 7.8/VS 11; 9.4/VS 12; 11.7/VS 13; 5.6/VS 14 and 0.2/VS 15. The lamp produced chromaticity coordinates (x,y) of 0.47 and 0.385, an operating lumens per watt (L/w) value of about 65 and a $Q_a$ value of 65 at a CCT of about 2430.

EXAMPLE 4

A conventional T8 fluorescent lamp was constructed with a phosphor layer comprising $3.5MgO*0.5MgF_2*GeO_2:Mn^{4+}$ (MfG); Yttrium Oxide:Eu ($Y_2O_3$:Eu) (YEO); (Ba,Sr,Ca)$MgAl_{10}O_{17}$:$Eu^{2+}$ (BAM) and (Ba,Sr,Ca)$MgAl_{10}O_{17}$:$Eu^{2+}$, $Mn^{2+}$ (BAMn). The weight percents of the phosphors were 26.29 wt %, 54.41 wt %, 0.89 wt % and 18.41 wt %, respectively. The lamp comprised a barrier layer between the glass envelope and the phosphor layer.

When energized, the lamp generated light having delta chroma values for each of the fifteen color samples of the CQS system as follows (delta chroma value/CQS color sample): 4.4/VS 1; 3/VS 2; −4.5/VS 3; 7.7/VS 4; 16/VS 5; 24.9/VS 6; 29.1/VS 7; 10.2/VS 8; −2.7/VS 9; 1.4/VS 10; 2.2/VS 11; 6.6/VS 12; 11.6/VS 13; 10.2/VS 14 and 6.4/VS 15. The lamp produced chromaticity coordinates (x,y) of 0.455 and 0.397, an operating lumens per watt (L/w) value of about 58 and a $Q_a$ value of 63 at a CCT of about 2780.

EXAMPLE 5

A conventional T8 fluorescent lamp was constructed with a phosphor layer comprising $3.5MgO*0.5MgF_2*GeO_2:Mn^{4+}$ (MfG); Yttrium Oxide:Eu ($Y_2O_3$:Eu) (YEO); Gadolinium Zinc Magnesium Pentaborate: Ce, Mn (Gd(Zn,Mg)$B_5O_{10}$: Ce,Mn (CBM) and (Ba,Sr,Ca)$MgAl_{10}O_{17}$:$Eu^{2+}$,$Mn^{2+}$ (BAMn). The weight percents of the phosphors were 14 wt %, 26 wt %, 40.5 wt % and 19.5 wt %, respectively. The lamp comprised a barrier layer between the glass envelope and the phosphor layer. FIG. 6 shows the emission spectrum for the lamp of this Example.

When energized, the lamp generated light having delta chroma values for each of the fifteen color samples of the CQS system as follows (delta chroma value/CQS color sample): 4.6/VS 1; 3.5/VS 2; −5.7/VS 3; 4.1/VS 4; 11.7/VS 5; 20.1/VS 6; 24.2/VS 7; 8.8/VS 8; −1.8/VS 9; 0.4/VS 10; −0.1/VS 11; 4.2/VS 12; 9/VS 13; 7.5/VS 14 and 4.7/VS 15. The lamp produced chromaticity coordinates (x,y) of 0.448 and 0.397, an operating lumens per watt (L/w) value of about 52 and a $Q_a$ value of 64 at a CCT of about 2760.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lamp having an improved color quality scale, the lamp comprising
   a rare earth phosphor layer comprising a phosphor composition excluding halophosphor in said phosphor layer, said composition comprising a first phosphor and a second phosphor, said first phosphor being selected from the group consisting of $Y_2O_3$:Eu; Gd(Zn,Mg)$B_5O_{10}$:Ce, Mn, or combinations thereof, and said second phosphor being selected from the group consisting of (Ba,Sr,Ca)$MgAl_{10}O_{17}$:$Eu^{2+}$,$Mn^{2+}$; $LaPO_4$:Ce,Tb;(Ce,Tb)$MgAl_{11}O_{19}$; and (Ce,Tb)(Mg,Mn)$Al_{11}O_{19}$, or, combinations thereof;
   said lamp generating light having delta chroma values for at least two of the 15 ($VS_{1-15}$) color samples of the color quality scale within the following parameters
   −2 to 7 for VS 1;
   −3 to 7 for VS 2;
   −7 to 7 for VS 3;
   −2 to 7 for VS 4;
   −2 to 14 for VS 5;
   1 to 19 for VS 6;
   4 to 24 for VS 7;
   −1 to 15 for VS 8;
   −2 to 7 for VS 9;
   −2 to 6 for VS 10;
   −2 to 6 for VS 11;
   −1 to 8 for VS 12;
   −1 to 13 for VS 13;
   −3 to 13 for VS 14; and
   −6 to 12 for VS 15,
   wherein said delta chroma values are measured in the CIE LAB space;
   wherein when said lamp is energized said lamp exhibits a correlated color temperature of between about 2200 Kelvin to about 3500 Kelvin.

2. The lamp of claim 1, said first phosphor having an emission band with a maximum between 590 to 640 nm.

3. The lamp of claim 1, said second phosphor having an emission band with a maximum between 500 to 570 nm.

4. The lamp of claim 1, said phosphor composition further comprising a third phosphor selected from the group consisting of $Y_2O_3$:Eu; $3.5MgO*0.5MgF_2*GeO_2$:$Mn^{4+}$; Gd(Zn,Mg)$B_5O_{10}$:Ce,Mn; (Ba,Sr,Ca)$MgAl_{10}O_{17}$:$Eu^{2+}$,$Mn^{2+}$; $LaPO_4$:Ce,Tb; (Ce,Tb)$MgAl_{11}O_{19}$; (Ce,Tb)(Mg,Mn)$Al_{11}O_{19}$; (Ba,Sr,Ca)$MgAl_{10}O_{17}$:$Eu^{2+}$; $Sr_4Al_{14}O_{25}$:Eu and $Y_3Al_5O_{12}$:Ce, or combinations thereof.

5. The lamp of claim 1, wherein said first phosphor is $Y_2O_3$:Eu, and said second phosphor is (Ba,Sr,Ca)$MgAl_{10}O_{17}$:$Eu^{2+}$,$Mn^{2+}$.

6. The lamp of claim 1, wherein when said lamp is energized said lamp exhibits a correlated color temperature of between about 2500 to about 3500 Kelvin and a color quality scale $Q_a$ value of about 60 or above.

7. The lamp of claim 1, further comprising a light-transmissive glass envelope having an inner surface, a discharge-sustaining fill gas sealed inside said envelope, and a barrier layer positioned between said envelope and said phosphor layer, wherein said barrier layer comprises alumina particles.

8. The lamp of claim 7, wherein the discharge-sustaining fill gas contains mercury.

9. A lamp having an improved color quality scale, the lamp comprising
   a rare earth phosphor layer comprising a phosphor composition excluding halophosphor in said phosphor layer, said composition comprising a first phosphor and a second phosphor;

said first phosphor having an emission band with a maximum between 590 nm and 640 nm and selected from the groups consisting of $Y_2O_3$:Eu; $Gd(Zn,Mg)B_5O_{10}$:Ce, Mn, or combinations thereof, wherein said first phosphor is present in an amount of 10 to 90 weight percent;

said second phosphor having an emission band with a maximum between 500 nm and 570 nm, wherein said second phosphor is present in an amount of 5 to 50 weight percent, and said lamp having a $Q_a$ value greater than 60 and a correlated color temperature between about 2500 and 3500 Kelvin.

10. The lamp of claim 9, said second phosphor being selected from the group consisting of $(Ba,Sr,Ca)MgAl_{10}O_{17}$:$Eu^{2+}$,$Mn^{2+}$; $LaPO_4$:Ce,Tb; $(Ce,Tb)MgAl_{11}O_{19}$; $(Ce,Tb)(Mg,Mn)Al_{11}O_{19}$, or combinations thereof.

11. The lamp of claim 9, wherein said first phosphor is $Y_2O_3$:Eu and said second phosphor is $(Ba,Sr,Ca)MgAl_{10}O_{17}$:$Eu^{2+}$,$Mn^{2+}$.

12. The lamp of claim 9, said phosphor blend further comprising a third phosphor selected from the group consisting of $Y_2O_3$:Eu; $3.5MgO*0.5MgF_2*GeO_2$:$Mn^{4+}$; $Gd(Zn,Mg)B_5O_{10}$:Ce,Mn; $(Ba,Sr,Ca)MgAl_{10}O_{17}$:$Eu^{2+}$,$Mn^{2+}$; $LaPO_4$:Ce,Tb; $(Ce,Tb)MgAl_{11}O_{19}$; $(Ce,Tb)(Mg,Mn)Al_{11}O_{19}$; $(Ba,Sr,Ca)MgAl_{10}O_{17}$:$Eu^{2+}$;$(Sr,Ba,Ca)_5(PO_4)_3Cl$:Eu; $Sr_4Al_{14}O_{25}$:Eu and $Y_3Al_5O_{12}$:Ce, or combinations thereof.

13. The lamp of claim 9, further comprising a light-transmissive glass envelope having an inner surface, a discharge-sustaining fill gas sealed inside said envelope, and a barrier layer positioned between said envelope and said phosphor layer, wherein said barrier layer comprises alumina particles.

14. A lamp having an improved color quality scale, the lamp comprising
a rare earth phosphor layer comprising a phosphor composition excluding halophosphor in said phosphor layer, said composition comprising at least two phosphors; and
wherein when said lamp is energized said lamp generates light having chroma delta values for all 15 ($VS_{1-15}$) color samples of the color quality scale within the following parameters
−2 to 7 for VS 1;
−3 to 7 for VS 2;
−7 to 7 for VS 3;
−2 to 7 for VS 4;
−2 to 14 for VS 5;
1 to 19 for VS 6;
4 to 24 for VS 7;
−1 to 15 for VS 8;
−2 to 7 for VS 9;
−2 to 6 for VS 10;
−2 to 6 for VS 11;
−1 to 8 for VS 12;
−1 to 13 for VS 13;
−3 to 13 for VS 14; and
−6 to 12 for VS 15,
wherein said chroma delta values are measured in the CIE LAB space;
wherein when said lamp is energized said lamp exhibits a correlated color temperature of between about 2200 Kelvin to about 3500 Kelvin.

15. The lamp of claim 14, said phosphor composition comprising a first phosphor and a second phosphor, wherein said first phosphor is selected from the group consisting of $Y_2O_3$:Eu; $Gd(Zn,Mg)B_5O_{10}$:Ce,Mn, or combinations thereof, and said second phosphor is selected from the group consisting of $(Ba,Sr,Ca)MgAl_{10}O_{17}$:$Eu^{2+}$,$Mn^{2+}$; $LaPO_4$:Ce,Tb; $(Ce,Tb)MgAl_{11}O_{19}$; $(Ce,Tb)(Mg,Mn)Al_{11}O_{19}$, or combinations thereof.

16. The lamp of claim 15, said phosphor blend further comprising a third phosphor selected from the group consisting of $Y_2O_3$:Eu; $3.5MgO*0.5MgF_2*GeO_2$:$Mn^{4+}$; $Gd(Zn,Mg)B_5O_{10}$:Ce,Mn; $(Ba,Sr,Ca)MgAl_{10}O_{17}$:$Eu^{2+}$,$Mn^{2+}$; $LaPO_4$:Ce,Tb; $(Ce,Tb)MgAl_{11}O_{19}$; $(Ce,Tb)(Mg,Mn)Al_{11}O_{19}$; $(Ba,Sr,Ca)MgAl_{10}O_{17}$:$Eu^{2+}$; $Sr_4Al_{14}O_{25}$:Eu and $Y_3Al_5O_{12}$:Ce, or combinations thereof.

17. The lamp of claim 15, said first phosphor having an emission band with a maximum between 590 nm and 640 nm, and
said second phosphor having an emission band with a maximum between 500 nm and 570 nm.

18. The lamp of claim 15, wherein said first phosphor is present in an amount of 10 to 90 weight percent and said second phosphor is present in an amount of 5 to 50 weight percent.

19. The lamp of claim 14, wherein when said lamp is energized said lamp exhibits a correlated color temperature of between about 2500 to about 3500 Kelvin and a color quality scale $Q_a$ value of about 60 or above, wherein said lamp generates visible light having a peak emission in the range of 590 to 615 nm.

20. A lamp having an improved color quality scale, said lamp comprising
a rare earth phosphor layer comprising a phosphor composition excluding halophosphor in said phosphor layer, said composition comprising at least two phosphors; and
generating light having chroma delta values for at least two of the 15 ($VS_{1-15}$) color samples of the color quality scale within the following parameters
−2 to 7 for VS 1;
−3 to 7 for VS 2;
−7 to 7 for VS 3;
−2 to 7 for VS 4;
−2 to 14 for VS 5;
1 to 19 for VS 6;
4 to 24 for VS 7;
−1 to 15 for VS 8;
−2 to 7 for VS 9;
−2 to 6 for VS 10;
−2 to 6 for VS 11;
−1 to 8 for VS 12;
−1 to 13 for VS 13;
−3 to 13 for VS 14;and
−6 to 12 for VS 15,
wherein said chroma delta values are measured in the CIE LAB space;
wherein when said lamp is energized said lamp exhibits a correlated color temperature of between about 2200 Kelvin to about 3500 Kelvin.

* * * * *